United States Patent
Bokmiller et al.

[19]

[11] Patent Number: 6,134,832
[45] Date of Patent: Oct. 24, 2000

[54] NEST AND STACK PLANT POT

[75] Inventors: David Bokmiller, Hudson; Michael Moon, Parma; Robert Gumpf, Stow; Shannon Mullins, Cuyahoga Falls; Mike Blomerley; Steve Pavelka, both of Akron, all of Ohio

[73] Assignee: Landmark Plastic Corporation, Akron, Ohio

[21] Appl. No.: 09/299,983

[22] Filed: Apr. 27, 1999

[51] Int. Cl.⁷ .............................. A01G 9/02; B65D 21/032
[52] U.S. Cl. ................ 47/66.1; 47/83; 206/509; 206/519
[58] Field of Search ...................... 47/65.5, 65.6, 47/66.1, 66.2, 71, 79, 901; D11/154, 143, 155; 206/504, 509, 519

[56] References Cited

U.S. PATENT DOCUMENTS

| | | |
|---|---|---|
| D. 20,336 | 11/1890 | Whilldin . |
| 1,391,353 | 9/1921 | Wells .......................................... 47/71 |
| 2,089,624 | 8/1937 | Smith . |
| 2,144,069 | 1/1939 | Lear . |
| 2,822,952 | 2/1958 | Scott . |
| 3,137,095 | 6/1964 | Pearson ........................................ 47/33 |
| 3,315,410 | 4/1967 | French ...................................... 47/65.7 |
| 3,326,410 | 6/1967 | Asenbauer ................................. 220/97 |
| 3,528,585 | 9/1970 | Kalmar . |
| 3,686,791 | 8/1972 | Mills . |
| 3,852,912 | 12/1974 | Diller ..................................... 47/34.11 |
| 3,896,587 | 7/1975 | Insalaco ...................................... 47/34 |
| 4,057,931 | 11/1977 | Stutelberg et al. . |
| 4,173,097 | 11/1979 | Staby . |
| 5,010,687 | 4/1991 | Hougard ...................................... 47/79 |
| 5,459,960 | 10/1995 | Manlove ..................................... 47/66 |
| 5,638,638 | 6/1997 | Moskowitz .................................. 47/71 |
| 5,761,848 | 6/1998 | Manlove ..................................... 47/66 |

FOREIGN PATENT DOCUMENTS

| | | | |
|---|---|---|---|
| 648801 | 1/1992 | Australia ................................... 47/71 |
| 2642266 | 1/1989 | France .................................... 47/66.6 |
| 3119778 | 12/1982 | Germany ............................... 47/65.5 |
| 2087701 | 6/1982 | United Kingdom .................... 47/65.5 |
| 2173984 | 10/1986 | United Kingdom .................... 47/65.5 |
| 2260308 | 4/1993 | United Kingdom .................... 47/66.6 |

*Primary Examiner*—Michael J. Carone
*Assistant Examiner*—Son T. Nguyen
*Attorney, Agent, or Firm*—Oldham & Oldham Co., LPA

[57] ABSTRACT

A plant pot which not only is capable, when empty, of being conveniently and compactly stored or "nested" in a columnar formation along with other unfilled pots like itself, but also has the ability, after a plant and growing medium have been placed in the pot, to be stacked in any of a number of orderly and stable arrangements among other planted pots, also of the same construction. Stacking of plant-containing pots is made possible by a plurality of interlock stacking grooves provided on the bottom of each pot. Six (6) grooves are provided, and the sides of every other groove define an arced ledge that can be rested upon and abutted against the inner periphery of the rim of another pot so that a number of pots can be arranged to form a securely stacked structure. Additionally, the pot of the present invention includes in its rim portion three strategically placed slots designed for receiving and securely holding identification tags and/or other informational tabs, tags or fixtures and for making the tags, etc. "tamper evident".

13 Claims, 6 Drawing Sheets

NEST AND STACK PLANT POT

FIELD OF THE INVENTION

The present invention relates generally to a plant container, and more specifically, to a plant pot which not only is capable, when empty, of being conveniently and compactly stored or "nested" in a columnar formation along with other unfilled pots like itself, but also has the ability, after a plant and growing medium have been placed in the pot, to be stacked in any of a number of orderly and stable arrangements among other planted pots, also of the same construction.

BACKGROUND OF THE INVENTION

Usage of pot-like containers to facilitate growing, transporting and marketing of plants has long been known. Two aspects of container use which have continued to present special challenges are: (1) storage of empty containers, especially before they are filled with growing medium and one or more plant organisms and (2) keeping large quantities of planted containers organized and protected during the various distribution and marketing stages encountered throughout the nursery and lawn and garden retailing industry. Space limitations are a primary consideration in either case. Where the containers that are to be used for plant potting operations either are not amenable to stacking within each other or may be stacked only in very limited quantities, considerable storage space must be provided either on or off the premises where potting operations take place. Even where a significant storage area may be available, it still may not be possible for a plant grower to accommodate the number of containers that may ultimately be required without the necessity of obtaining multiple pot shipments, which for any of a number of reasons could be subject to delays which may in turn have an adverse impact on the grower's ability to complete its potting activities in a timely and cost effective manner. Once plants have been potted, space limitations continue to loom not only at the grower's facility as the plants await shipment to other destinations, but also on board transport means where it frequently is desired to include in the lowest number of shipments as many potted plants as practicable without incurring significant risk of plant damage. At retail establishments, similar demands also are felt as retailers seek to display and maintain as wide a variety of potted plants as possible in the least amount of area.

Over the years, various efforts have been made to provide container designs aimed at alleviating such space-related problems. In the late nineteenth century, a plant pot that lent itself to nesting and stacking became known. The principal feature of the pot, which was disclosed in U.S. Design Pat. No. 20,336, was the base which, according to the disclosure, had an annular rim divided into a number of sections by recesses radiating from a central recess formed by and within the rim.

More recently, a plant container with stacking capabilities has been disclosed in U.S. Pat. No. 4,057,931. The container is molded from plastic and is provided with an annular rim adjacent the bottom thereof, which supports the pot so that the bottom surface is spaced upwardly from a surface supporting the pot. The rim of the pot is provided with a plurality of apertures defined and positioned therein so that the upper edges of two similar pots may be positioned to support one pot on the lower two. While the aperture arrangement described by the referenced patent may be employed to vertically stack the pots in an interlocking manner, it the stacking capability of the pots is limited to a single row of pots. While more than one row of pots may be stacked beside one another the pots in adjacent rows may not likewise be interlocked to produce a pot array having both lateral and longitudinal stability.

The plant pot of the present invention includes features which not only make it highly nestable with others when it is empty, but also make it vertically stackable with others after planting in a configuration that will be both laterally and longitudinally interlocked.

SUMMARY OF THE INVENTION

The present invention is a plant container or pot that has new and useful features which: (1) allow the pot, when it is empty, to be conveniently and compactly stored or nested within another pot like itself and to in turn receive for storage within itself yet another a pot of the same kind and (2) permit the pot, after a plant has been potted therein, to be rested or stacked in an interlocking manner upon a portion of the rim region of up to three other underlying pots, again of the same constructions and dimensions. Stacking of plant-containing pots is made possible by a plurality of curvilinear interlock stacking grooves provided on the bottom of each pot. Six (6) grooves are provided, and the sides of every other groove define an arced ledge that can be rested upon and abutted against the inner periphery of the rim of another pot so that a number of pots can be arranged to form a securely stacked structure. Additionally, the pot of the present invention includes in its rim portion three (3) equally sized and spaced slots designed for receiving and securely holding identification tags and/or other informational tabs, tags or fixtures and for making the tags, etc. "tamper evident".

DETAILED DESCRIPTION OF THE PREFERRED EMBODIMENT

Figure 1:
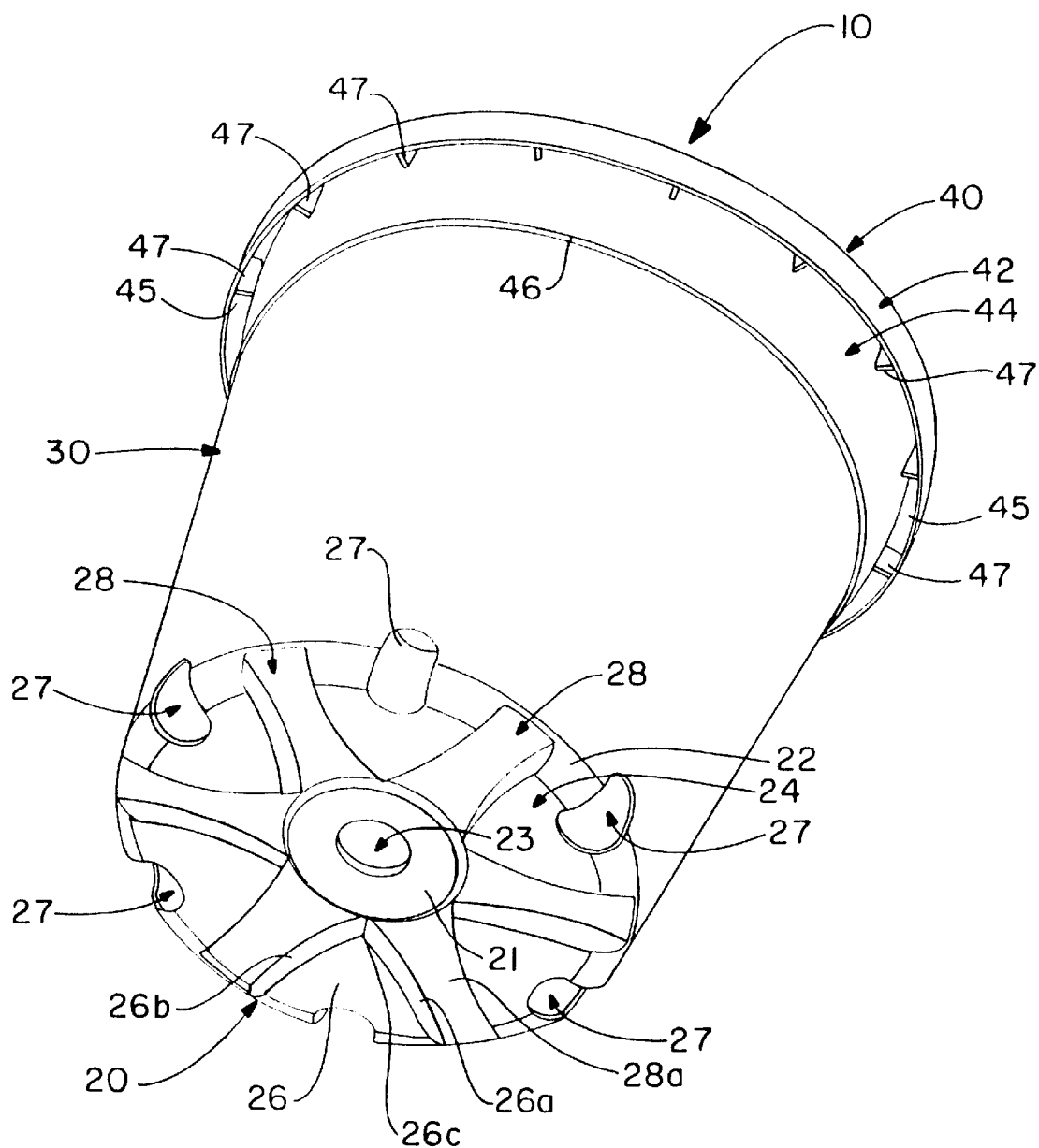
FIG. 1 is a perspective view of a plant pot according to the present invention, wherein the bottom of the pot as well as a portion of the pot's curved side wall and top rim areas are visible.

A plant pot in accordance with a preferred embodiment of the present invention is indicated generally in FIG. 1 by the reference numeral 10. The pot 10 is a single-piece receptacle molded by conventional means from any of a number of known non-porous plastic substances. The pot 10 is comprised of three general regions: (1) a generally circular and horizontally extending base or bottom region 20; (2) a sleeve-like side region 30 having an outwardly tapered wall that extends upwardly from the bottom region 20; and (3) an annular top region 40 that projects upwardly from the circular top perimeter of the side region 30.

The top region 40 includes a rim 42, a band 44 and a transitional flange 46. As may be most clearly seen by reference to FIG. 2, the rim 42 includes a gently rounded upper surface 42a and a downwardly extending side surface 42b. Together the surfaces 42a and 42b cause the rim 42 to project radially outward from the top of the band 44, and along with an adjacent portion of the band 44, to define a hollow inverted channel 45 which extends continuously about the top of the pot 10. Within the channel 45, a plurality of rib-like gussets 47 are provided. The gussets 47 are equidistantly spaced about the channel 45 and serve to reinforce the rim 42 against radial and axial deformation. Like the side region 30, the side band 44 is outwardly tapered with its diameter increasing gradually as the band advances toward the rim 42. The transitional flange 46 extends radially inward from the bottom edge of the band 44 and to the top edge of the side region 30. The flange 46 serves not only to reinforce the lower portion of the region 40, but also to facilitate nesting of the pot 10 in a manner as will hereinafter be described.

Figure 3:
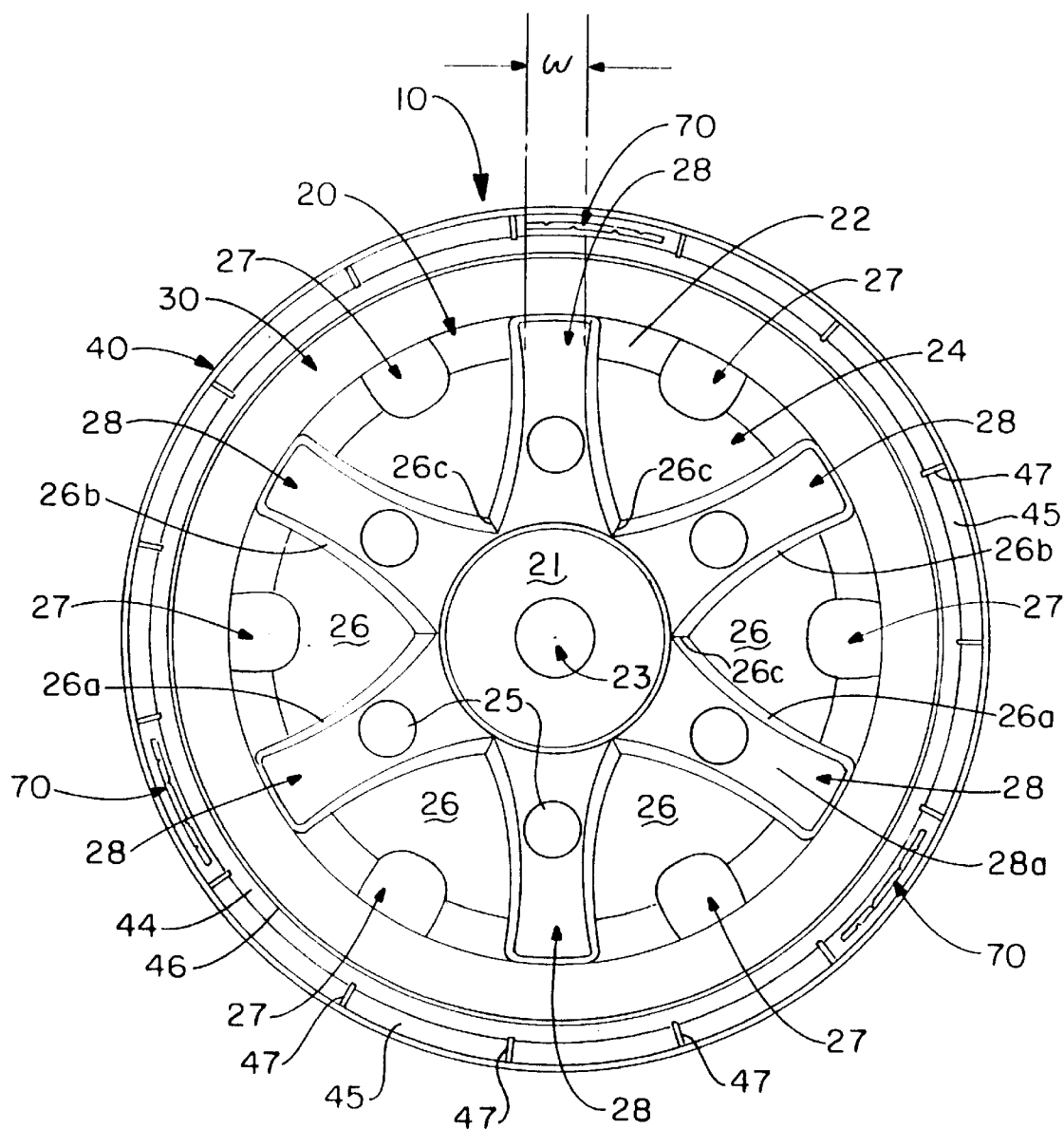
FIG. 3 is a bottom planar view of a plant pot according to the present invention
Figure 6:
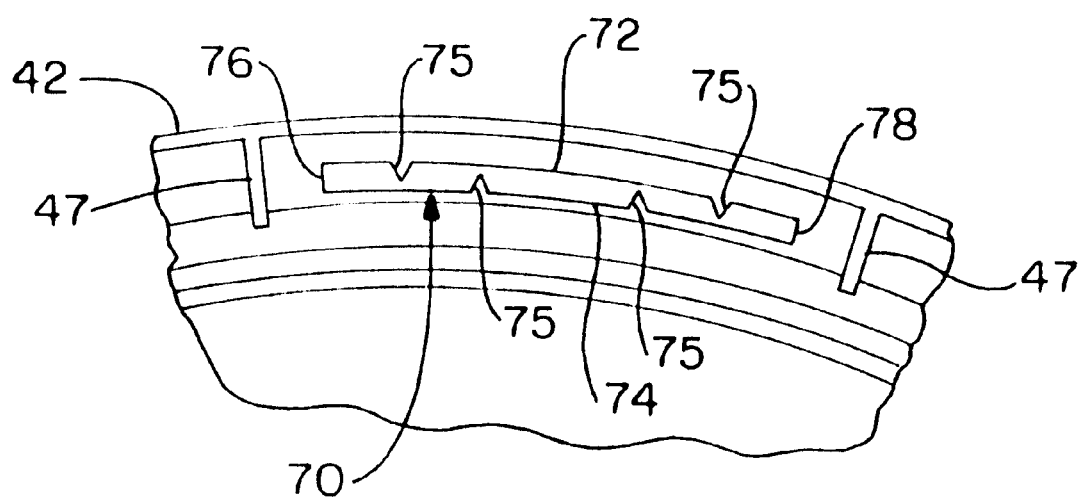
FIG. 6 is a bottom planar view (in enlarged detail) of a portion of the rim area of the plant pot according to the present invention.

As may be seen in FIG. 3, the rim 42 is provided with three circumferentially extending slots 70 that pass through the upper surface 42a. The three slots 70 are dimensionally the same, and they are located such that their radially extending, transverse center lines are spaced at equal angular intervals (120°) measured with reference to the vertical center line of the pot 10. Each of the slots 70 are situated between a neighboring pair of the gussets 47 in the channel 45 and are aligned vertically with alternating channels included among the plurality of channels 28 provided in the bottom portion 20. (Particulars regarding the plurality of channels 28 are provided hereinbelow.) As most clearly shown in FIG. 6, each of the slots 70 includes an outer circumferential edge 72, an inner circumferential edge 74, a first radially extending, transverse edge 76 and a second radially extending, transverse edge 78. The first and second transverse edges 76 and 78 lay circumferentially opposite one another and extend between adjacent ends of the outer and inner circumferential edges 72 and 74. Each of the slots 70 further include a plurality of pointed serrations 75 that project into each slot 70 from the outer and inner circumferential edges 72 and 74 thereof. In the preferred embodiment of the present invention, two serrations 75 are provided on the outer slot edge 72 and two serrations 75 are provided on the inner slot edge 74. The serrations 75 are positioned on the respective edges 72 and 74 at equal distances relative to the radially extending, transverse center line of the slot 70. It will be noted that the serrations 75 on the edge 72 are at a greater distance from the center line of the slot 70 than are the serrations on the edge 74.

The slots 70, as above described, are designed to hold an identification tag and/or informational tab, tag or fixture (none shown). The serrations 75 act to hold the tag, etc. firmly within the slots 70 and to thereby make the pot 10 "tamper evident" should an attempt be made to withdraw the tag, etc.

As previously indicated, the side section 30, when viewed perpendicularly to the longitudinal axis of the pot 10 (See FIG. 2), tapers outwardly as it extends upwardly away from the bottom region 20. Preferably, the angle of taper a of the side section 30 will be 5° from vertical, although other smaller or larger angles may be used and are intended to be within the scope of the invention. The angle of taper β of the side band 44 of the region 40 may be the same as angle a for the side region 30, or it may deviate therefrom if desired.

Figure 2:
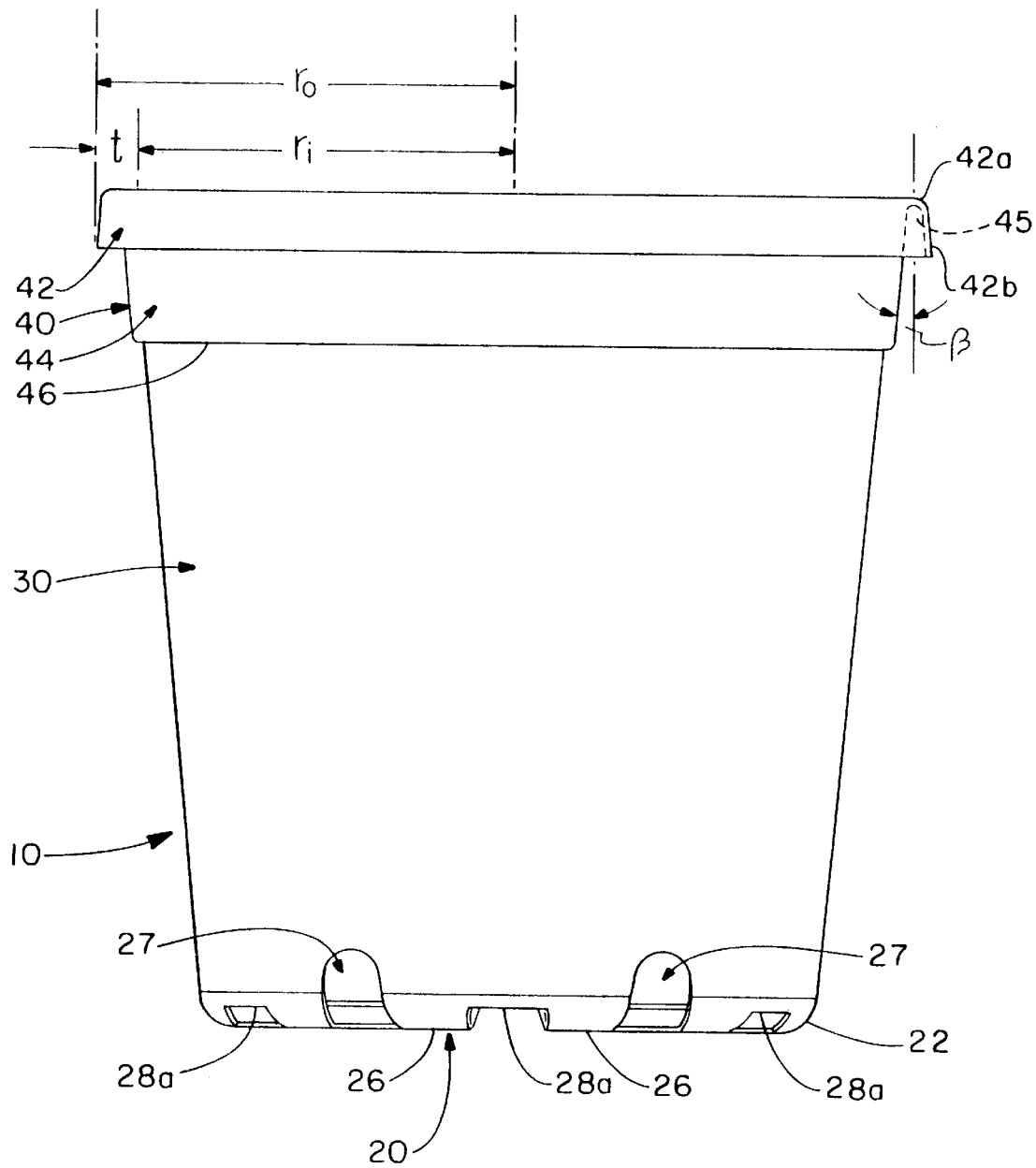
FIG. 2 is a side elevational view of a plant pot according to the present invention.

As may be seen by reference to FIGS. 1, 2 and 3, the bottom region 20 includes an outer annular band 22 that curves radially inward from the bottom of the side region 30 and toward a centralized base 24. As shown most clearly by FIGS. 1 and 3 of the drawings, the centralized base 24 is not a totally flat structure. Rather, the base 24 exhibits molded features which include a plurality of promontory-like elements 26 and a plurality of channels 28 which are defined by the elements 26. The preferred embodiment of the present invention includes six of the promontory-like elements 26 and six of the channels 28. Each of the promontory elements 26 extend radially inward toward the center of the base 24 and have arcuate sides 26a and 26b whose amount of curvature is equal in magnitude but opposite in direction and which join with one another in the form of a linear apex 26c. The promontory-like elements 26 are arranged about the base 24 at equal angular intervals relative to the center of the base 24 and with the apex 26c of each of the elements 26 being situated at a uniform radial distance from the center of the base 24. The sides 26a and 26b of the elements 26 define the opposing sides of each of the channels 28 which additionally include a flat, horizontal member 28a that interconnects the sides 26a and 26b. Each of the channels 28 project upwardly toward the rim 42 and into the interior of the pot 10. The channels 28 also extend radially outward into the outer annular band 22.

The base 24 also may include a circular recess 21 lying inwardly of the promontory-like elements 26 and channels 28. The recess 21 will be elevated relative to the base member 28a each of the channels 28, and thus will also project into the interior of the pot 10, but to a greater longitudinal distance than the channels 28. The recess 21 may also be provided with a center orifice 23 which may serve as a central drain for the pot 10. Six additional orifices 25 may also be provided in the base 24. The additional orifices 25 preferably will be arranged in a circular pattern about the center orifice 23 and with one each of the orifices 25 passing through the base member 28a of each of the channels 28. The orifices 25 provide supplemental drainage for the pot 10. Further drainage openings may also be provided in the bottom region 20 of the pot 10. Such openings, identified by the reference numeral 27 in the drawings, will be situated at a greater distance outward from the additional orifices 25 and will predominantly pass through the pot 10 at the outer annular band 22. Portions of the openings 27 will also extend relatively short distances into the promontory-like elements 26 and the lower portion of the sleeve-like side region 30. Preferably, each of the openings 27 also will lie equidistantly between circumferentially adjoining pairs of the channels 28.

Figure 4:
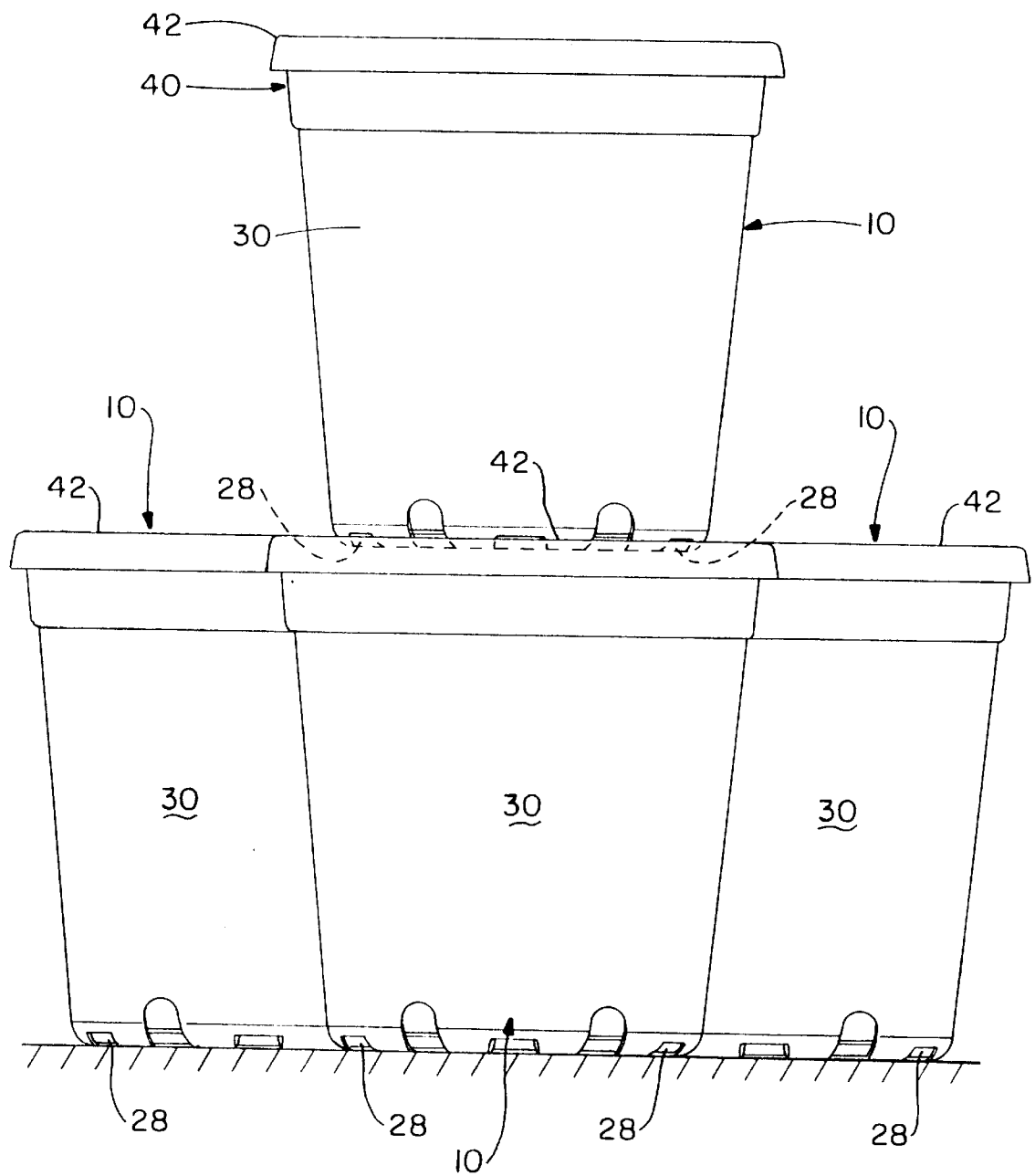
FIG. 4 is a side elevational view of a plurality of plant pots made according to the present invention, shown in a stacked relationship.
Figure 5:
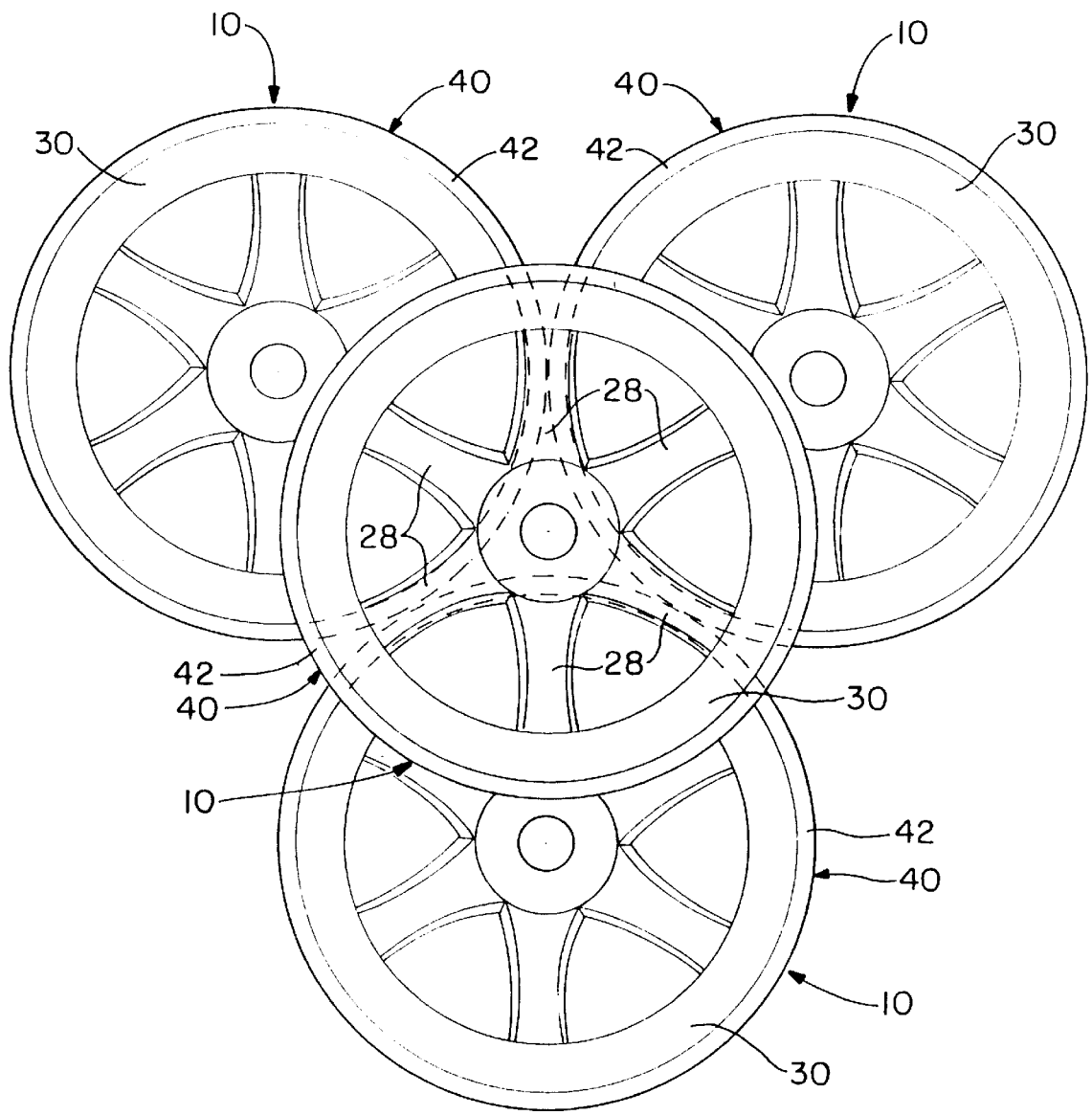
FIG. 5 is top planar view of the plurality of stacked plant pots shown in FIG. 4.

Certain dimensional characteristics of the promontory-like elements 26 and the channels 28 make it possible for the pot 10 to achieve distinctive stacking and interlocking capability with other pots 10 made according to the present invention. As may be seen in FIG. 2, the rim 42 of the pot 10 will have an inside radius $r_i$ (measured perpendicularly from the central longitudinal axis of the pot 10) an outside radius $r_o$ (measured from the same reference as $r_i$) and a thickness t. The thickness t of the rim 42 will be equal to $r_o - r_i$. By providing the arcuate sides 26a and 26b of all of the elements 26 with an amount of curvature corresponding to the inside radius $r_i$ of the rim 42 and by providing each of the channels 28 with a lateral width w that is at least equal to twice the thickness t of the rim 42, i.e., $2(r_o - r_i)$, it will become possible to place the bottom region 20 of one pot 10 atop the annular top region 40 of another pot 10 as indicated in FIGS. 4 and 5 so that the rim 42 of the underlying pot 10 will be received within two of the channels 28 of the overlying pot 10 and the gently rounded upper surface 42a of the underlying pot 10 will make contact with the horizontal members 28a of the overlying pot 10 and the band 44 of the underlying pot 10 will make contact with the arcuate side 26a of one element 26 and the arcuate element 26b of another neighbor element 26.

By providing two additional underlying pots 10 so that they not only are in contact at their rim side surface 42b with each other, but also are in similar contact with the underlying pot 10 already mentioned above, the bottom region 20 of the overlying pot 10 may also be made to rest atop the annular top region 40 of each of the additional underlying pots 10 with the rim 42 of each of the additional pots 10 be similarly received within channels 28 of the overlying pot 10. It should be evident that if even more underlying pots 10 are provided, it will then become possible to support one or more additional overlying pots 10 in a stacked and interlocking manner and that when at least three overlying pots 10 have been stacked upon the first group of underlying pots 10, it then will become possible to position at least one pot 10 atop the pots 10 which overlie the first group. As more pots 10 are added to each previously established level, a longer, wider and higher interlocking arrangement of the pots 10 may be created.

Improved nesting capability is also achievable with the pots 10. As previously indicated, such capability is highly desirable prior to pot planting operations. This same capability may also be of value after plants and growing medium have been removed, and rather than being discarded, the pots 10 are kept for reuse. Features of the pot 10 which permit it to be conveniently and compactly nested with others of its kind include the outer annular band 22, the promontory-like elements 26, the channels 28 and the circular recess 21. The tapered side region 30, side band 44 and transitional flange 46 also contribute to the nesting capability of the pot 10.

The manner in which the aforementioned features promote nesting of the pot 10 may be illustrated by describing what may be expected to occur as one empty pot 10 made according to the present invention is received (the "received pot") within the vacant plant and growing medium receptacle of another pot 10 (the "receiving pot"). As the received pot is lowered into receptacle of the receiving pot, air within the receptacle will be permitted to escape via any of the various openings 23, 25 and 27 which may be provided in the bottom region 20. With air being permitted to freely escape from the receptacle of the receiving pot a cushion or layer of pressurized air that would otherwise tend to repel the bottom of the received pot and limit how far it may advance toward the bottom of the receiving pot is avoided. As the received pot is lowered into the receiving pot, the radial clearances between the inside surface of the side region 30 and the side band 44 of the receiving pot and the outside surface of the side region 30 and the side band 44 of the received pot diminish. Since the side region 30 and the side band 44 of each of the pots are provided with outwardly tapered rather than vertical walls, the clearances diminish in a gradual manner with the received pot being able to advance into the receiving pot without interference as would otherwise be the case if the side regions 30 of the received and receiving pots were vertical and thus of a uniform diameter from top to bottom.

The outer annular band 22, promontory-like elements 26, channels 28 and center recess 21 cooperate to complete the advancement of the received pot within the receiving pot. It will be recalled that the outer annular band 22 curves radially inward from the bottom of the side region 30 and toward the center of the centralized base 24. This inward curvature results in the formation of a rounded instead of an angular corner where the bottom region 20 and the sleeve-like side region 30 intersect. It should be intuitively evident that, if the region of intersection were angular rather than rounded, contact between the received pot and the receiving pot would be made by the angular corner of the received pot at a point along the inside of the side region 30 of the receiving pot and such contact would stop advancement of the received pot within the receiving pot. With the region of intersection being a rounded corner as provided by the present invention such premature contact is avoided and additional advancement of the received pot is the result. When the promontory-like elements 26, the channels 28 and the center recess 21 are viewed from the outside of the pot 10, the promontory-like elements 26 project outwardly from the base 24, the channels 28 project upwardly into the base 24 and the recess 21 also projects upwardly into the base 24 a distance beyond that to which the channels 28 project. Alternatively, when the elements 26, the channels 28 and the recess 21 are viewed from within the pot 10 they appear oppositely in form to that which was observed form the outside of the pot 10, i.e., the elements 26 appear as depressions in the base 24, the channels appear as raised rib-like formations that radiate outwardly from the center of the base 24 and the recess 21 appears as a raised disc-like formation that is elevated above the rib-like formations that radially emanate from it. This diametrical aspect of the elements 26, the channels 28 and the center recess 21 further enhances the nesting capability of the pot 10 by allowing the base 24 of the received pot to be axially rotated in the plant and growing medium receptacle of the receiving pot and to thereby bring the elements 26 and channels 28 of the received pot into alignment with the elements 26 and channels 28 of the receiving pot, respectively. Such alignment allow the elements 26, channels 28 and recess 21 of the received pot to receivingly engage the elements 26, channels 28 and recess 21 of the receiving pot and thus to permit the received pot to advance within the receiving pot to the maximum extent possible.

The transitional flange 46 further complements the nesting capabilities of the pot 10 by providing an generally horizontal annular surface which can act as a stop preventing the received pot from being advanced too far into the receiving pot and thus becoming jammed therein. Avoidance of jamming will facilitate separation or denesting of the received and the receiving pot when for example it becomes desirable to commence potting operations.

While the preferred embodiment of the invention has been described above, it will be recognized and understood that various modifications may be made therein and the appended claims are intended to cover all such modifications which may fall within the spirit and scope of the invention.

What is claimed is:

1. A plant pot for holding a growing medium and a plant, said pot comprising:
   a generally circular and horizontally extending bottom that includes an outer annular band and a centralized base within said band, said centralized base having a plurality of promontory-like elements and a plurality of channels defined by said promontory-like elements;
   a sleeve-like side region joined to said horizontally extending bottom at said outer annular band and having an outwardly tapered wall that extends upwardly from said outer annular band of said base; and
   an annular top region having a rim, a side band connected to said rim and a transitional flange projecting radially inward from said side band and joining said annular top region to said sleeve-like side region;

wherein said annular top region, said sleeve-like region, said plurality of channels, said plurality of promontory elements, said centralized base and said outer annular band are configured to allow said pot, when empty, to be conveniently and compactly nested in a columnar formation with a like empty pot and to further allow said pot, when holding said growing medium and said plant, to be stacked in an interlocking manner upon a portion of a rim region of a plurality of underlying like growing medium and plant-holding pots; and wherein each of said promontory-like elements extends radially inward toward the center of said centralized base and have a first arcuate side and a second arcuate side, each of said first and second arcuate sides being provided with an amount of curvature that is equal in magnitude but opposite in direction from the other of said arcuate sides and which join one another to form a linear apex.

2. A plant pot according to claim 1, wherein said promontory-like elements are arranged in a circular pattern about said centralized base, at equal angular intervals relative to the center of said base and with said apex of each of said promontory-like elements being situated at a uniform radial distance from the center of said base.

3. A plant pot according to claim 1, wherein each of said channels lie between each of said promontory-like elements, said elements being neighboring elements and said channels being curvilinear channels.

4. A plant pot according to claim 3, wherein each of said channels has a pair of opposed vertical sides, said pair of vertical sides being comprised of a first arcuate side of a first of said neighboring promontory-like members and a second arcuate side of a second of said neighboring promontory-like members.

5. A plant pot according to claim 4, wherein each of said channels further has a flat, horizontal base member, said horizontal base member extending between said pair of opposed vertical sides.

6. A plant pot according to claim 3, wherein said centralized base further includes a circular recess, said recess lying inwardly of said promontory-like elements and said channels.

7. A plant pot according to claim 6, wherein each of said channels extends radially outward from the periphery of said circular recess and into said outer annular band of said horizontally extending base and wherein each of said channels has an inner opening that arcuately communicates with a portion of the periphery of said circular recess and an outer opening that communicates with said outer annular band.

8. A plant pot according to claim 7, wherein said rim of said top region includes a rim upper surface extending radially outward from the top of said side band and a downwardly extending rim side surface, said rim upper surface and said downwardly extending rim side surface causing said rim to project radially outward from said side band, and along with said side band to define a hollow inverted channel.

9. A plant pot according to claim 8, wherein said rim has an inside radius, $r_i$, an outside radius, $r_o$, and a thickness, t, said thickness t being equivalent to $r_o-r_i$, and wherein each of said channels of said centralized base has a lateral width w, said width w being at least equal to twice said thickness t.

10. A plant pot according to claim 9, wherein said amount of curvature provided to said first and second arcuate sides of each of said promontory-like elements corresponds to said inside radius $r_i$ of said rim.

11. A plant pot according to claim 10 wherein said plurality of promontory-like elements consists of six elements and said plurality of channels consists of six channels.

12. A plant pot according to claim 8, wherein said rim upper surface includes a plurality of circumferentially extending slots passing through said rim upper surface, each of said slots having an outer circumferential edge, an inner circumferential edge, a first transverse edge and a second transverse edge, each of said outer and inner circumferential edges being provided with a plurality of serration-like projections, said projections protruding into said slots.

13. A plant pot according to claim 12, wherein said plurality of circumferentially extending slots includes three circumferentially extending slots and said three circumferentially extending slots are located in said rim upper surface so that each radially extending, transverse center line of said three slots is equally spaced about the periphery of said rim upper surface at angular intervals equivalent to 120° measured relative to a vertical center line of said pot and so that each radially extending, transverse center line of said three slots is vertically aligned with a radially extending center line of three of said six channels.

* * * * *